United States Patent Office 3,646,218
Patented Feb. 29, 1972

3,646,218
PENICILLIC ACID DERIVATIVES AND RELATED COMPOUNDS AND METHOD OF PRODUCING THEM
Jerold Alan Last, Princeton, and Saul Lewis Neidleman, Lawrence Township, N.J., assignors to E. R. Squibb & Sons, Inc., New York, N.Y.
No Drawing. Filed May 14, 1969, Ser. No. 824,693
Int. Cl. C07c 49/24
U.S. Cl. 260—594                  7 Claims

ABSTRACT OF THE DISCLOSURE

This invention relates to brominated products of the general formula

I 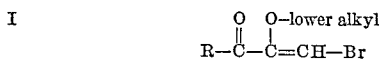

and to the method of producing them. The products are useful as antimicrobial agents and also as intermediates.

SUMMARY OF THE INVENTION

This invention relates to brominated products of the general formula

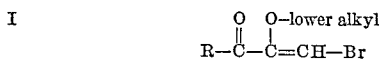

and to the method for producing them.

In the above formula R represents hydrogen, lower alkyl, lower alkenyl or phenyl.

The lower alkyl groups in the above formula are straight or branched chain saturated hydrocarbon radicals of up to seven carbon atoms such as methyl, ethyl, propyl, isopropyl, butyl, isobutyl, t-butyl and the like. The lower alkenyl groups are monounsaturated groups of the same type, preferably with the double bond joining the 1,2-carbons of that group, e.g., vinyl, propenyl, preferably 1-propenyl, isopropenyl, butenyl, preferably 1-butenyl, isobutenyl, preferably 1-methyl-1-propenyl, and the like.

DETAILED DESCRIPTION OF THE INVENTION

The compounds of this invention are obtained from unsaturated acids of the formula (II) 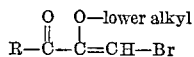

wherein R has the meaning already defined, for example, penicillic acid, dihydropencillic acid, 2-methoxy-3-ketopenta - 2,5-diene-1-carboxylic acid, 4-hydroxy-3-methoxy-4 - phenyl - 2-butenoic acid, 2-methoxy-3-keto-3-phenylprop-2-ene-1-carboxylic acid, etc. Some of such acids also exist in tautomeric, lactone form and the lactone form may also be used as a starting material. The lactones may be formulated as follows:

(III) 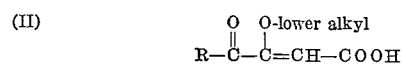

wherein R has the meaning previously defined.

According to this invention, the acid of Formula II or the lactone of Formula III or a mixture of the two is treated either with N-bromosuccinimide or with the chloroperoxidase obtained from a microorganism of the genus Caldariomyces, e.g., Caldariomyces fumago, together with bromide in the presence of hydrogen peroxide.

According to the one method, the acid and/or lactone is treated with N-bromosuccinimide in an aqueous reaction medium, e.g., aqueous dioxane, at a temperature in the range of about 15° to 40° C., preferably at a pH in the range of about 4 to 5. About 10 minutes to 240 minutes are required for the reaction to be complete. A buffer may be used to maintain the pH in the desired range. The preferred buffer is acetic acid-sodium acetate in order to maintain the pH at about 4.4. Preferably, the acid and/or lactone is dissolved in the reaction medium, the buffer is added, then the N-bromosuccinimide is also added to this, optimally with stirring.

For the alternate method, as a source of the halogenating enzyme, the microorganism Caldariomyces fumago may be used. The microorganism can be grown as a static culture on Czapek-Dox medium at room temperature for 14–20 days. The halogenating enzyme is prepared as a water extract of an acetone powder of the microorganism.

In addition to the halogenating enzyme, hydrogen peroxide must also be present in the reaction mixture. Although hydrogen peroxide itself may be added to the mixture, the hydrogen peroxide may be prepared in situ by use of a peroxide producing enzyme system. Such enzyme systems are well known in the art and include glucose oxidase in the presence of glucose, D- and L-amino acid oxidases in the presence of D- or L-methionine, and diamine oxidase in the presence of histamine. Although substantially any concentration of hydrogen peroxide may be used, preferably the hydrogen peroxide is present in a molar ratio of about 0.1 to 1 to about 100 to 1 (optimally about 1 to 1 to about 10 to 1) based on the weight of the substrate. If a peroxide producing enzyme system is used, the concentration of the enzyme is so adjusted to yield the same concentration of hydrogen peroxide as stated above.

The reaction is preferably conducted at a pH in the range of about 2.2 to about 6 (optimally about 2.2 to about 4 and most advantageously at pH 3.0 in the presence of hydrogen peroxide and about 4 to about 6, most advantageously at pH 5 in the presence of enzymatically produced hydrogen peroxide). To assure that the pH of the reaction mixture is maintained in this range, a buffering agent which buffers in the desired pH range is preferably also added to the reaction medium. Suitable buffers include McIlvaine's buffer, potassium citrate buffer, sodium acetate buffer, potassium phosphate buffer and potassium formate buffer.

The reaction is carried out in an aqueous medium under aerobic conditions, normally at a temperature in the range of about 20° C. to about 30° C. The components of the medium, namley, the substrate, buffering agent, halogenating enzyme, and hydrogen peroxide source are merely mixed with water and the resultant mixture agitated or shaken to assure adequate aeration for about 10 to about 200 minutes (optimally about 30 minutes to about 240 minutes).

Although the halogenating enzyme acts merely as a catalyst and hence can be present in any proportion, to assure maximum conversion of the starting substrate to the desired final product, the enzyme is prepared by grinding the acetone powder of the microorganism with ten times its weight of acid washed sand in distilled water, 20–30 ml./gm. acetone powder, for 2–5 minutes.

The compounds of Formula I are useful as antimicrobial agents, e.g., in combatting organisms such as *Staphylococcus aureus, Salmonella schottmuelleri, Proteus vulgaris, Escherichia coli, Candida albicans, Trichophyton mentagrophytes, Fusarium bulbigenum, Mycobacterium tuberculosis* as well as other species of such genera or the like. They may be used as surface disinfectants. About 0.01 to 1.0% by weight of any of these substances may be dispersed on an inert solid or in a liquid such as water and applied as a dust or spray or incorporated in a soap or other cleansing agent such as a solid or liquid detergent composition. The latter may be used, for example, in general cleaning, in cleaning dairy barns or dairy, food handling or food processing equipment. Those compounds of Formula I are also useful as intermediates, for example, they will react at the keto group with aminoguanidine or an acid addition salt thereof to form aminoguanidine derivatives which also have antimicrobial activity of the same character.

The following examples are illustrative of the invention. All temperatures are on the centigrade scale.

Example 1

170 mg. of penicillic acid is dissolved in 15 ml. of purified dioxane. To this is added 6 ml. of a buffer (pH 4.4) prepared by dissolving 6 gm. sodium acetate and 6.6 ml. of glacial acetic acid in a final volume of 100 ml. of water, 178 mg. of N-bromosuccinimide is then added and the mixture is stirred for 15 minutes at room temperature. The reaction mixture is extracted with chloroform. Further purification of the product, 1-bromo-2-methoxy-3-keto-4-methylpenta-1,4-diene is achieved by thin layer chromatography of the concentrated chloroform extract on silica gel GF using benzene as the developing solvent. The identity of the product is established by mass spectrometry, IR, and elemental analysis.

Example 2

320 mg. of penicillic acid is dissolved in 7.5 ml. purified dioxane. Three ml. of the buffer described in Example 1 is added along with 356 mg. N-bromosuccinimide. After stirring for 15 minutes at room temperature, 40 ml. of 0.3 M potassium phosphate, pH 3.0, is added. The mixture is extracted with three batches of 15 ml. (each) ethyl acetate. The ethyl acetate extracts are pooled, dried with anhydrous sodium sulfate, filtered, and concentrated at a temperature below 30° C. on a flash evaporator. This concentrate is further purified by thin layer chromatography as in Example 1. The ultraviolet absorbing band corresponding to 1-bromo-2-methoxy-3-keto-4-methylpenta-1,4-diene is scraped from the thin layer plate and eluted with several 10 ml. portions of chloroform. The chloroform extracts are pooled, dried with anhydrous sodium sulfate, filtered, and concentrated at a temperature below 30° on a flash evaporator. The concentrate is stored over phosphorous pentoxide in a vacuum desiccator to give 85 mg. of a light yellow viscous liquid, representing a yield of 22% of theory.

Example 3

500 mg. of dihydropenicillic acid is treated with 550 mg. of N-bromosuccinimide as described in Example 2. The brominated derivative, 1-bromo-2-methoxy-3-keto-4-methylpenta-1-ene, is isolated as described in Example 2.

Example 4

250 mg. of 2-methoxy-3-ketopenta-2,5-diene-1-carboxylic acid is treated with 262 mg. of N-bromosuccinimide as described in Example 2. The brominated derivative, 1-bromo-2-methoxy-3-ketopenta-1,4-diene, is isolated as described in Example 2.

Example 5

375 mg. of 3-hydroxy-3-phenyl-2-methoxyprop-2-ene-1-carboxylic acid lactone is treated with 350 mg. of N-bromosuccinimide as described in Example 2. The brominated derivative, 3-phenyl-3-keto-2-methoxy-1-bromoprop-1-ene is isolated as described in Example 2.

Example 6

To 200 ml. of a *Caldariomyces fumago* ATCC 16373 halogenating enzyme solution, prepared by grinding 12 g. of the acetone powder of this organism with 120 g. of acid washed sand and 300 ml. of water for 5 minutes, then centrifuging and filtering, are added 40 ml. 0.3% hydrogen peroxide, 80 ml. 0.3 M potassium phosphate buffer (pH 3.0), 200 mg. potassium bromide, 200 mg. of penicillic acid in 16 ml. dimethylsulfoxide and 24 ml. water. The mixture is placed on a rotary shaker at 25° C. for 15 minutes. The mixture is then extracted with 200 ml. chloroform. The chloroform layer is collected, dried over anhydrous sodium sulfate, and evaporated to near dryness in vacuo. The concentrate is chromatographed and the band corresponding to 1-bromo-2-methoxy-3-keto-4-methylpenta-1,4-diene is isolated as in Examples 1 and 2.

What is claimed is:

1. A process which comprises reacting an acid of the formula

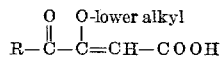

wherein R represents lower alkyl or lower alkenyl, or the lactone of said acid, with N-bromosuccinimide to produce a compound of the formula

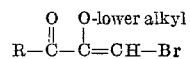

wherein R has the same meaning as above.

2. A process as in claim 1 wherein the acid is penicillic acid.
3. A process as in claim 1 wherein the lactone is the lactone of penicillic acid.
4. A process as in claim 1 wherein the acid is dihydropenicillic acid.
5. A compound of the formula

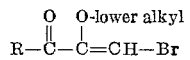

wherein R is lower alkyl or lower alkenyl.

6. A compound as in claim 5 wherein R is isopropenyl and the lower alkyl group is methyl.
7. A compound as in claim 5 wherein R is isopropyl and the lower alkyl group is methyl.

References Cited

UNITED STATES PATENTS 2,725,384  11/1955  Burness _____ 260—594

DANIEL D. HORWITZ, Primary Examiner

U.S. Cl. X.R.

195—30; 260—592, 602; 424—331

PO-1050
(5/69)

UNITED STATES PATENT OFFICE
CERTIFICATE OF CORRECTION

Patent No. 3,646,218      Dated February 29, 1972

Inventor(s) Jerold Alan Last and Saul Lewis Neidleman

It is certified that error appears in the above-identified patent and that said Letters Patent are hereby corrected as shown below:

Column 1, line 50, "dihydropencillic" should read --dihydropenicillic--. Column 1, formula III,

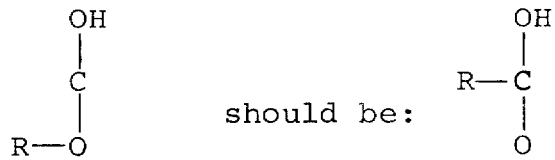

Signed and sealed this 24th day of October 1972.

(SEAL)
Attest:

EDWARD M. FLETCHER, JR.            ROBERT GOTTSCHALK
Attesting Officer                     Commissioner of Patents